(12) United States Patent
Khutorsky

(10) Patent No.: US 12,337,572 B2
(45) Date of Patent: Jun. 24, 2025

(54) LAMINATED COMPOSITE WITH NON-UNIFORM PROFILE AND METHOD OF MANUFACTURING THE SAME

(71) Applicants: Hyundai Motor Company, Seoul (KR); Kia Corporation, Seoul (KR)

(72) Inventor: Alex L. Khutorsky, Sylvania, OH (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 52 days.

(21) Appl. No.: 17/988,155

(22) Filed: Nov. 16, 2022

(65) Prior Publication Data

US 2024/0157677 A1    May 16, 2024

(51) Int. Cl.
| | | |
|---|---|---|
| *B32B 15/08* | (2006.01) | |
| *B32B 5/10* | (2006.01) | |
| *B32B 27/06* | (2006.01) | |
| *B32B 37/06* | (2006.01) | |
| *B60J 5/04* | (2006.01) | |

(52) U.S. Cl.
CPC ............ *B32B 15/08* (2013.01); *B32B 5/10* (2013.01); *B32B 37/06* (2013.01); *B32B 27/06* (2013.01); *B32B 2311/30* (2013.01)

(58) Field of Classification Search
CPC .............. B32B 15/02; B32B 15/06–098
USPC ............................................. 428/35.9
See application file for complete search history.

(56) References Cited

U.S. PATENT DOCUMENTS

| | | | | | |
|---|---|---|---|---|---|
| 3,031,358 | A | * | 4/1962 | Rutter | B21D 13/02 52/783.11 |
| 3,256,669 | A | * | 6/1966 | Seiwert | B21D 49/00 52/630 |
| 3,489,446 | A | * | 1/1970 | Williams | B23K 11/163 219/91.21 |
| 4,122,325 | A | * | 10/1978 | Featherstone | B23K 35/226 219/91.21 |
| 4,331,723 | A | * | 5/1982 | Hamm | B32B 5/28 428/113 |
| 4,650,951 | A | * | 3/1987 | Koga | H05K 3/4084 219/118 |
| 4,791,765 | A | * | 12/1988 | Noggle | B32B 3/00 428/614 |
| 5,030,488 | A | * | 7/1991 | Sobolev | B32B 15/20 428/464 |
| 5,124,191 | A | * | 6/1992 | Seksaria | B32B 15/20 52/789.1 |
| 5,347,099 | A | * | 9/1994 | Gissinger | B23K 11/163 219/84 |

(Continued)

OTHER PUBLICATIONS

Mitsubishi Chemical Advanced Materials ("MCAM") product information page, "PPS Plastics—Material Properties of Polyphenylene sulfide", accessed online Nov. 14, 2024, https://www.mcam.com/en/products/pps (Year: 2024).*

*Primary Examiner* — Michael C Romanowski
(74) *Attorney, Agent, or Firm* — Fox Rothschild LLP

(57) ABSTRACT

Disclosed are laminated composites, vehicle parts including the same, and methods of manufacturing the same. The laminated composite may include a pair of metal sheets, and a polymer (e.g., conductive or non-conductive) disposed between the pair of the metal sheets. The laminated composite includes one or more connection parts where the pair of the metal sheets are directly connected or welded along the length direction and that do not comprise the polymer.

14 Claims, 7 Drawing Sheets a) Joining to Side Flanges          b) Joining to Middle Flange

(56) References Cited

U.S. PATENT DOCUMENTS

| | | | | |
|---|---|---|---|---|
| 5,524,406 | A * | 6/1996 | Ragland | B23K 11/11 219/91.21 |
| 5,575,526 | A * | 11/1996 | Wycech | B62D 29/002 296/187.02 |
| 6,037,559 | A * | 3/2000 | Okabe | B23K 11/115 219/91.23 |
| 6,337,471 | B1 * | 1/2002 | Kistner | B21D 53/045 219/645 |
| 8,047,593 | B2 * | 11/2011 | Fuchs | B29C 66/742 156/60 |
| 11,338,552 | B2 * | 5/2022 | Tullis | B32B 15/085 |
| 2006/0062998 | A1 * | 3/2006 | Taylor | B32B 15/08 428/364 |
| 2006/0134395 | A1 * | 6/2006 | Sigler | B32B 15/16 428/521 |
| 2007/0295704 | A1 * | 12/2007 | Sigler | B32B 15/16 219/146.22 |
| 2009/0096245 | A1 * | 4/2009 | Sundarraj | B22F 3/115 296/146.1 |
| 2009/0155584 | A1 * | 6/2009 | Rolland | B32B 27/306 428/339 |
| 2009/0188746 | A1 * | 7/2009 | Yamada | F16F 1/37 181/207 |
| 2012/0040135 | A1 * | 2/2012 | Werthen | B32B 7/12 428/189 |
| 2012/0214018 | A1 * | 8/2012 | Mizrahi | B32B 15/14 428/600 |
| 2013/0017406 | A1 * | 1/2013 | Kinefuchi | B60J 5/0443 428/209 |
| 2013/0227890 | A1 * | 9/2013 | Kobayashi | B60J 5/048 29/11 |
| 2014/0298875 | A1 * | 10/2014 | Chergui | B21C 37/02 72/46 |
| 2015/0140327 | A1 * | 5/2015 | Oh | B32B 7/12 428/458 |
| 2017/0001367 | A1 * | 1/2017 | Hofer | B32B 27/12 |
| 2017/0028514 | A1 * | 2/2017 | Yang | B32B 37/12 |
| 2017/0188650 | A1 * | 7/2017 | Hector, Jr. | B32B 15/08 |
| 2017/0210087 | A1 * | 7/2017 | Wang | B23K 20/233 |
| 2017/0313030 | A1 * | 11/2017 | Song | B29C 70/845 |
| 2018/0085846 | A1 * | 3/2018 | Voigt | B23K 9/201 |
| 2018/0162097 | A1 * | 6/2018 | Blaski | B32B 15/088 |
| 2018/0261811 | A1 * | 9/2018 | Kellner | B32B 27/32 |
| 2019/0277082 | A1 * | 9/2019 | Millard | B32B 37/18 |
| 2020/0346416 | A1 * | 11/2020 | Song | B29C 66/721 |
| 2021/0197735 | A1 * | 7/2021 | Nardella, Sr. | B32B 25/08 |
| 2022/0063246 | A1 * | 3/2022 | Sim | B32B 7/05 |
| 2022/0315131 | A1 * | 10/2022 | Ibaragi | B32B 15/14 |
| 2022/0388290 | A1 * | 12/2022 | Pack | B32B 27/281 |

* cited by examiner

Butt (Side) Laser Welding

Seam (Overlap) Laser Welding

FIG. 7A
FIG. 7B
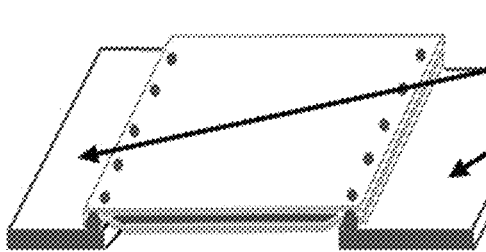
a) Joining to Side Flanges
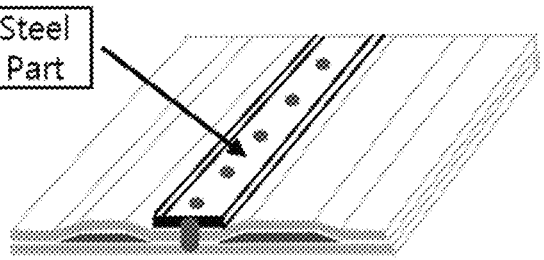
b) Joining to Middle Flange Laminated Composite with Uniform Profile Laminated Composite with Non-Uniform Profile Laser Weld Tailor Welded Coils/Blanks with Non-Uniform Profile Laminated Composite

LAMINATED COMPOSITE WITH NON-UNIFORM PROFILE AND METHOD OF MANUFACTURING THE SAME

TECHNICAL FIELD

Provided herein are, inter alia, laminated composites, vehicle parts including the same, and methods of manufacturing the same.

BACKGROUND

Laminated composite sheet materials combining metal skins and intermediate polymer layer have to been used in vehicles. For instance, the laminated composite sheet materials may be provided as alternative for aluminum steel while those materials can reduce weights of the vehicle parts. However, conventional laminated composite sheets having uniform profile (e.g. uniform thickness throughout the sheets) may not be formed in a suitable width for manufacturing vehicle parts and conventional welding process may not be feasible for processing those laminated composite sheets.

There is a need for novel steel composite materials in recent auto industry.

SUMMARY

In preferred aspects, provided are laminated composites having non-uniform profile (e.g., non-uniform thickness along the width direction), which may be intended for manufacturing vehicles parts (e.g., door, tray roof, hood, etc.) and be feasible to processes such as stamping, flanging, hemming. Also, in preferred aspects, provided are the methods of manufacturing the laminated composites and vehicle parts using the same.

In an aspect, provided is a laminated composite including a pair of metal sheets, and a polymer disposed between the pair of the metal sheets. The laminated composite includes one or more connection parts where the pair of the metal sheets are directly connected or welded along the length direction and that do not comprise the polymer.

The metal sheets as used herein refers to a metal material formed into thin, planar sheet made from different metals, alloys or combinations thereof, for example, aluminum, brass, copper, steel (e.g., carbon steel, stainless steel, or alloys including iron), tin, nickel and titanium, or alloys thereof. In certain embodiments, the metal sheets include steel sheets, aluminum or its alloys, magnesium alloys, copper or its alloys or the like.

The polymer may include a conductive polymer or non-conductive polymer. In certain embodiments, the polymer is a conductive polymer. In certain embodiments, the polymer is a non-conductive polymer.

The laminated composite may have closed ends (e.g., flanges) formed by the pair of the metal sheets along the length direction.

Preferably, the connection parts may be formed in one or more flanges of the metal sheets or in middle portions of the metal sheets along the length direction.

A width of each steel sheet is greater than a width of the polymer. A thickness of the one or more connection parts across the width direction of the laminated composite is less than a thickness of a portion comprising the pair of the metal sheets and polymer.

Preferably, the polymer may suitably include poly(fluorene) s, polyphenylenes, polypyrenes, polyazulenes, polynaphthalenes, poly(acetylene) s, poly(p-phenylene vinylene), poly(pyrrole) s, polycarbazoles, polyindoles, polyazepines, polyanilines, poly(thiophene) s, poly(3,4-ethylenedioxythiophene), poly(p-phenylene sulfide), or combinations thereof.

The laminated composite may further include one or more reinforcement members.

The one or more reinforcement members may be made of steel. The one or more reinforcement members are connected or welded to the one or more connection parts (e.g., flanges).

Preferably, the laminated composite has a width of about 1,200 mm to about 2,000 mm.

In an aspect, provided is a method of manufacturing the laminated composite. The method includes steps of: providing a pair of metal sheets and a polymer; disposing the polymer between the pair of the metal sheets; forming a laminated composite by directly connecting or welding the pair of the metal sheets at one or more connection parts along the length direction. The connection parts do not include the polymer.

The method may further include additional spot-welding the connection parts.

The method may further include connecting or welding one or more reinforcement members on the connection parts (e.g., flanges).

The pair of the metal sheets are connected or welded at the one or more connection parts by resistance spot welding (RSW), fusional welding, laser welding, electron beam welding, plasma welding, fusion welding, or combinations thereof.

The laminated composite has closed ends (e.g., flanges) formed by the pair of the metal sheets along the length direction, and the connection parts are formed in one or more flanges of the metal sheets or in middle portions of the metal sheets along the length direction.

A thickness of the one or more connection parts across the width direction of the laminated composite is less than a thickness of a portion including the pair of the metal sheets and polymer.

In another aspect, provided is a vehicle part including the laminated structure as disclosed herein.

The vehicle part may include a roof rail, a panel, a package tray, a hood, a door belt rail, or a roof panel.

Also provided is a vehicle including the vehicle part as described herein.

In another aspect, provided is a method of manufacturing a vehicle part. The method includes steps of: providing one or more laminated composites as described herein, or each of which may be manufactured by the methods described herein; and connecting or welding the one or more laminated composites at flanges of the laminated composites.

The laminated composite material as disclosed herein may have reduced weight (e.g., 30-35% weight reduction) compared to conventional steel material used in vehicle parts and may be produced with reduced cost that may be less than that for producing aluminum alloy sheet.

Also, the laminated composite material as disclosed herein may be produced with expanded width so it can be used for a large body panels (e.g., roof, hood, or tailgate of a vehicle), for example, by fabricating them and joining themselves.

The laminated composite materials may be further fabricated by various welding methods without substantial limitations. For example, the laminated composite with non-uniform profile can be assembled by resistance spot welding or any fusion welding (e.g., including laser or gas metal arc) applicable to steel members.

Other aspects of the invention are disclosed infra.

BRIEF DESCRIPTION OF THE DRAWINGS

FIG. 7 shows exemplary reinforcement members (steel parts) welded and joined to exemplary laminated composite sheets according to exemplary embodiments of the present disclosure.

DETAILED DESCRIPTION

Figure 1A:
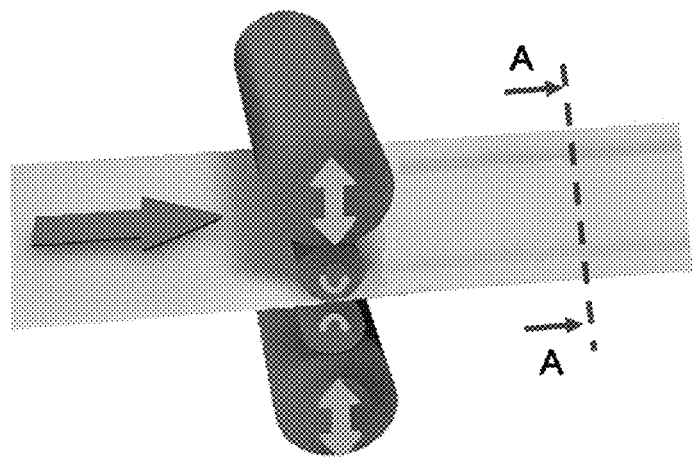
FIG. 1A shows an exemplary amination process to manufacture a continuous laminated composite according to an exemplary embodiment of the present disclosure.

Hereinafter, specific contents for solving the above-described objective and problems will be described in detail with reference to the accompanying drawings. On the other hand, when the detailed description of a known technology in the same field is not helpful in understanding the core content of the invention in understanding the present invention, the description will be omitted, and the technical spirit of the present invention is not limited thereto and may be variously implemented by being changed by those skilled in the art.

Like reference numbers refer to like elements throughout the description of the figures. In the drawings, the sizes of structures may be exaggerated for clarity. It will be understood that, although the terms "first", "second", etc. may be used herein to describe various elements, these elements should not be construed as being limited by these terms, which are used only to distinguish one element from another. For example, within the scope defined by the present invention, a "first" element may be referred to as a "second" element, and similarly, a "second" element may be referred to as a "first" element. Singular forms are intended to encompass the plural meaning as well, unless the context clearly indicates otherwise.

It will be further understood that terms such as "comprise" or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures, and/or expressions that represent ingredients, reaction conditions, polymer compositions, and amounts of mixtures used in the specification are approximations that reflect various uncertainties of measurement occurring inherently in obtaining these figures, among other things. For this reason, it should be understood that, in all cases, the term "about" should be understood to modify all such numbers, figures and/or expressions. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5, and 6.5 to 9, between appropriate integers that fall within the range. In addition, for example, the range of "10% to 30%" encompasses all integers that include numbers such as 10%, 11%, 12%, and 13%, as well as 30%, and any sub-ranges, such as 10% to 15%, 12% to 18%, or 20% to 30%, as well as any numbers, such as 10.5%, 15.5%, and 25.5%, between appropriate integers that fall within the range.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Composites

The disclosure provides laminated composite materials ("composites") and methods of manufacturing the composites. Preferably, the laminated composite has non-uniform profile (e.g., non-uniform thickness in cross-section) so the thickness and compositions across the width thereof may vary.

Figure 1B:
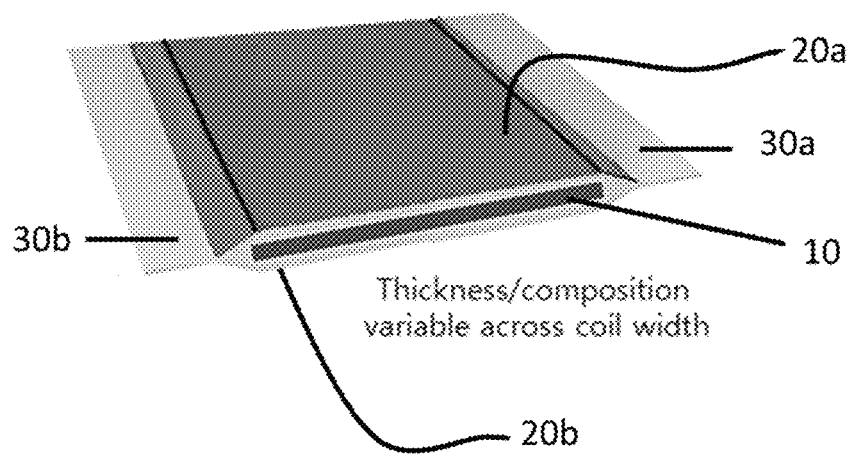
FIG. 1B shows an exemplary laminated composite with its cross section view along A-A in FIG. 1A.

In an aspect, in FIG. 1, provided is a laminated composite (1) including pair of metal sheets (20a, 20b), and a polymer (10) disposed between the pair of the metal sheets. Particularly, the laminated composite is formed with one or more connection parts (30a, 30b) where the pair of the metal sheets are directly connected or welded along the length direction (e.g., parallel to the length of the sheet or coil) and that do not include the polymer. In order to form the connection parts, a width of each steel sheet is greater than a width of the polymer.

Figure 2:
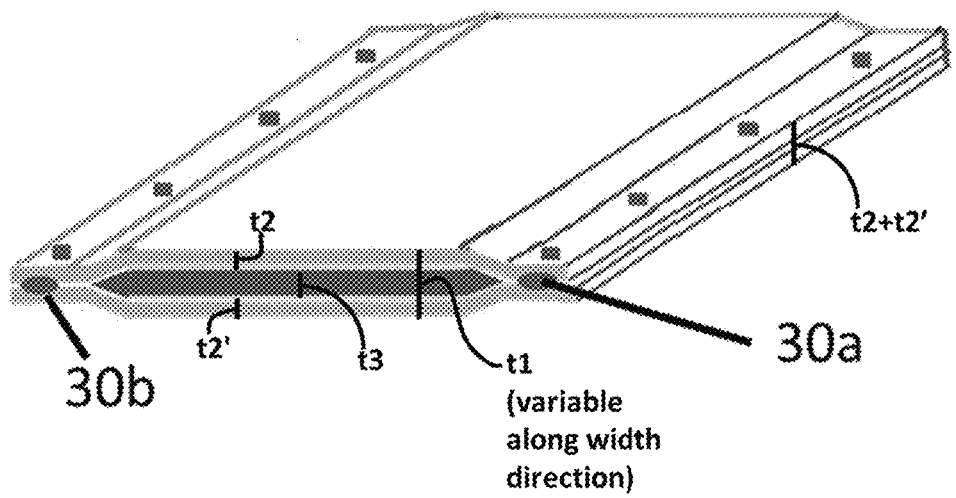
FIG. 2 shows an exemplary laminated Composite with non-uniform profile (non-uniform thickness) according to an exemplary embodiment of the present disclosure.
Figure 3:
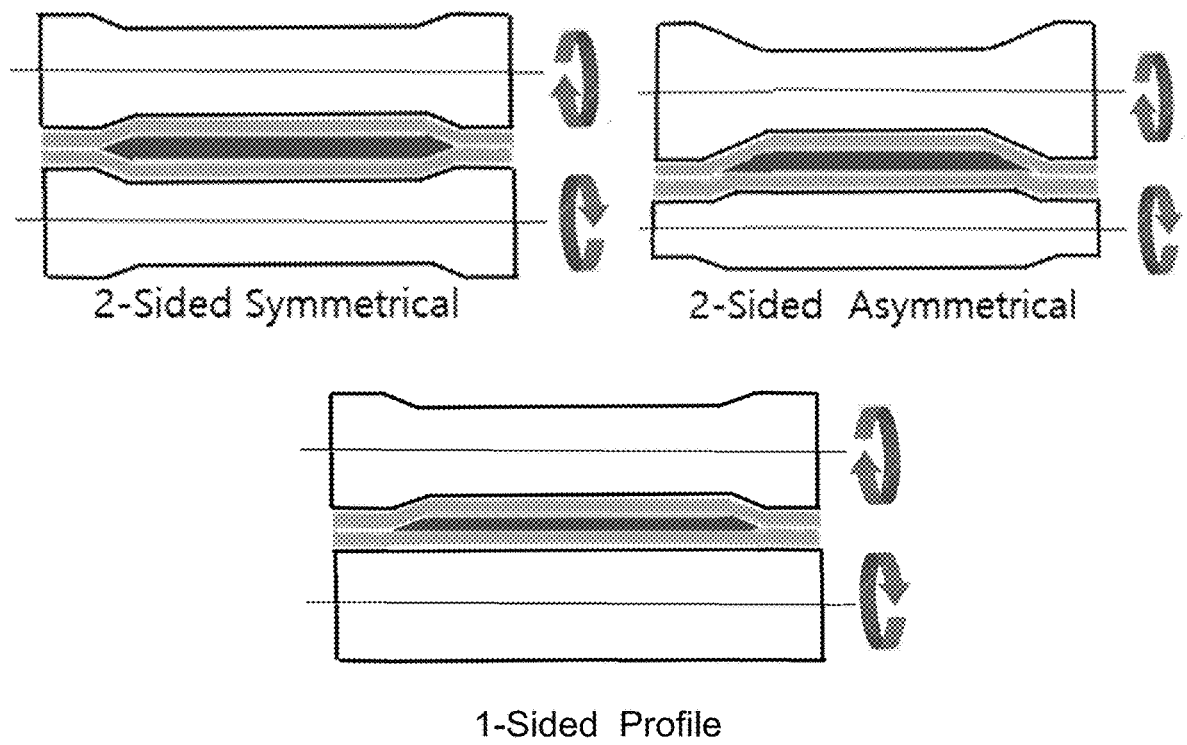
FIG. 3 shows exemplary geometry along the cross section of the exemplary laminated composites according to exemplary embodiments of the present disclosure.

A stack of the metal sheets and the polymer may be laminated by an apparatus (e.g., FIG. 1A) to close ends of the metal sheets along the length direction. The laminating the two metal sheets without intervening polymer may be performed by any welding process (e.g., pressing, rolling, hot stamping, etc.) without any limitation. In certain embodiments, the connection parts (30a, 30b) may optionally be processed, connected or welded by spot welding or fusion welding (e.g., laser, gas metal arc, plasma, etc.) (FIG. 2).

Figure 4:
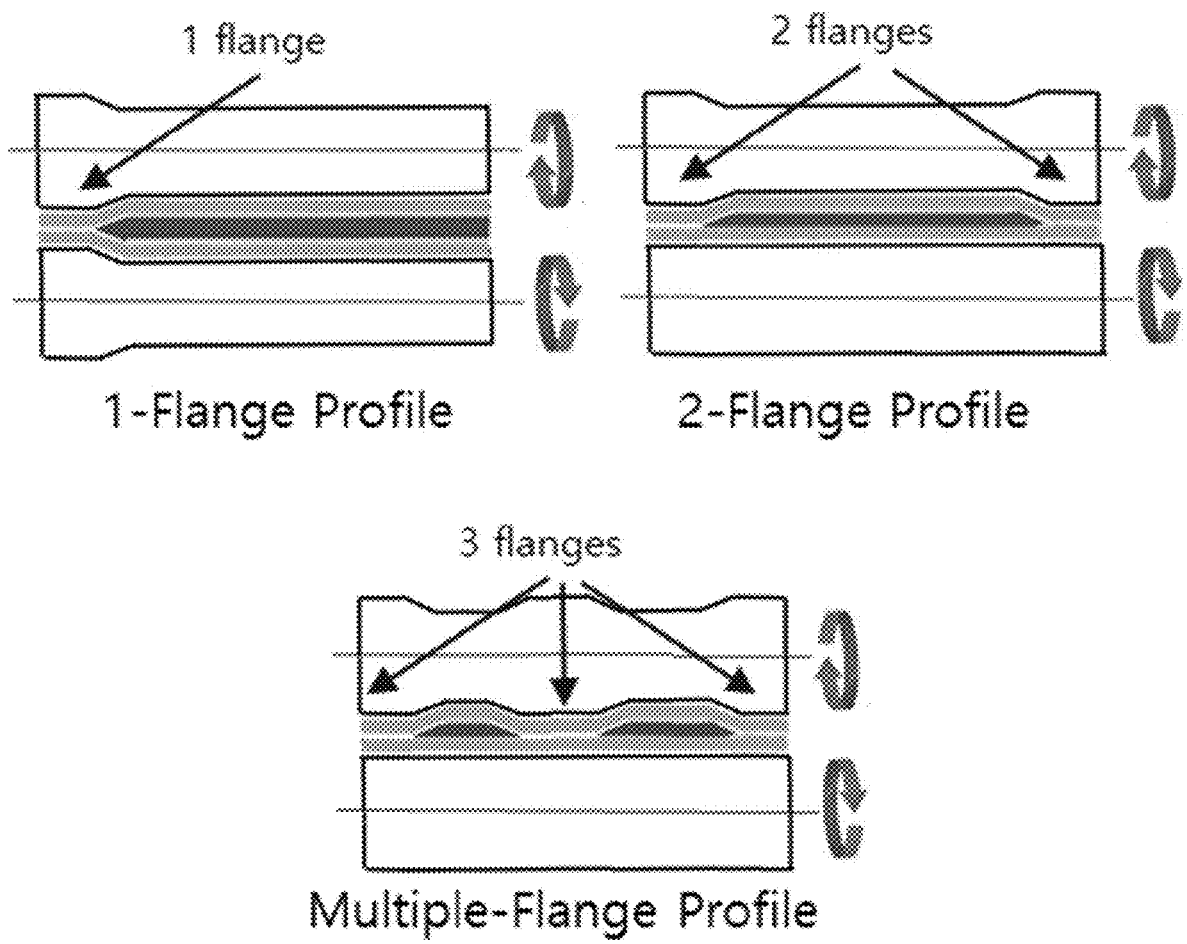
FIG. 4 shows exemplary connection parts (flanges) along the cross section of the exemplary laminated composites according to exemplary embodiments of the present disclosure.

The connection parts may be formed in one or more flanges (30a, 30b) of the metal sheets or in middle portions of the metal sheets along the length direction. In certain embodiments, the connection parts may be formed in two or more flanges, three or more flanges, or multiple flanges (FIG. 4).

A thickness of the one or more connection parts across the width direction of the laminated composite is less than a thickness of a portion comprising the pair of the metal sheets and polymer.

For example, when a thickness of the laminated composite is t1, the thicknesses of two sheets are respectively, t2 and t2', and a maximum thickness of the polymer disposed between two sheets is t3, the thicknesses of the laminated composite (t1) at different position along the width direction may be within a range from a sum of the thicknesses of two sheets (t2+t2') to a sum of the thicknesses of two sheets and a maximum thickness of the copolymer disposed between two sheets (t2+t2'+t3). The thickness at the longitudinal end of the sheets (e.g., flanges) may be the sum of the thicknesses of two sheets (t2+t2').

In certain embodiments, each of the metal sheets may have a thickness of about 0.05 mm to 10 mm, about 0.1 to 5 mm, or about 0.2 mm to 2 mm. In certain embodiments, the maximum thickness of the polymer may have a thickness of about 0.05 mm to 10 mm, about 0.1 to 5 mm, or about 0.2 mm to 4 mm.

In certain embodiments, variation in thickness may not exceed about 50%, about 60%, exceed about 70%, or exceed about 80%.

The polymer may suitably include poly(fluorene) s, polyphenylenes, polypyrenes, polyazulenes, polynaphthalenes, poly(acetylene) s, poly(p-phenylene vinylene), poly(pyrrole) s, polycarbazoles, polyindoles, polyazepines, polyanilines, poly(thiophene) s, poly(3,4-ethylenedioxythiophene), poly(p-phenylene sulfide), or combinations thereof.

The laminated composite may further include one or more reinforcement members. For example, the one or more reinforcement members are made of steel and the reinforcement members are connected or welded to the one or more connection parts (FIG. 7A-7B). The reinforcement member may be attached, connected or welded to the side flanges (FIG. 7A) or to the middle flanges (FIG. 7B). Other welding process (e.g., fusion welding, or RSW) joint configurations may be used on the laminated coils, particularly at the connections parts where the polymer does not exist.

In certain embodiments, the one or more reinforcement members may be attached, connected or welded to the side flanges or to the middle flanges after fabrication of the laminated composite. For example, the laminated composites is fabricated in the shape of coil or blank and then parts are formed by stamping or other applicable process. As fabrication step reinforcing members may be attached (welded) to the laminated composite part by using flange areas (FIGS. 7A and 7B).

The laminated composite may suitably have a width at least of about 1,200 mm, at least of about 1,300 mm, at least of about 1,400 mm, at least of about 1,500 mm, at least of about 1,600 mm at least of about 1,700 mm at least of about 1,800 mm at least of about 1,900 mm, or at least of about 2,000 mm. Preferably, the laminated composite may suitably have a width of about 1,200 mm to about 2,000 mm, or 1,500 mm to about 1,600 mm. In certain embodiments, the laminated composite may suitably have a width greater than about 1,500 mm, or greater than about 1,600 mm.

Figure 6A:
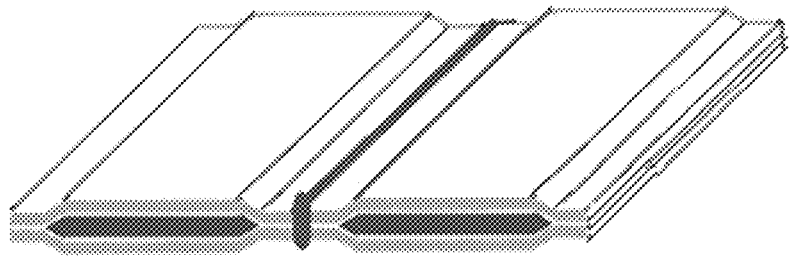
FIGS. 6A and 6B show exemplary fabrication methods of tailor welding one or more laminated composite sheets according to exemplary embodiments of the present disclosure.
Figure 6B:
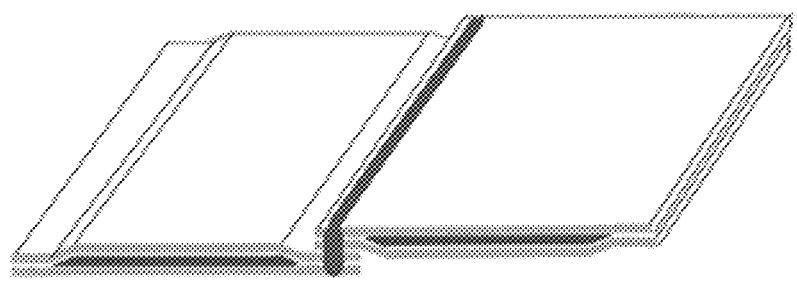

In certain embodiments, the laminated composites may be used to producing a laminated coil of any extended width without restrictions by utilizing tailor welding blanks/coils technology (e.g., FIGS. 6A and 6B).

The laminated composite may be formed in a roll or coil by laminating.

In certain embodiments, 2-sided (symmetrical or asymmetrical) profiles of lamination types may be obtained by adjusting the laminating apparatus (e.g., rolling and pressing apparatus). Likewise, 1-sided profile may be formed by adjusting the laminating apparatus (e.g., rolling and pressing apparatus).

In certain embodiments, a width, an amount, and a position of the polymer may be designed or adjusted for utility of the laminated composite sheet or coil. For example, as shown in FIG. 4, the polymer is disposed single or several positions in case one flange, two or more flanges, three or more flanges, or multiple flanges are formed (FIG. 4).

Figure 5:
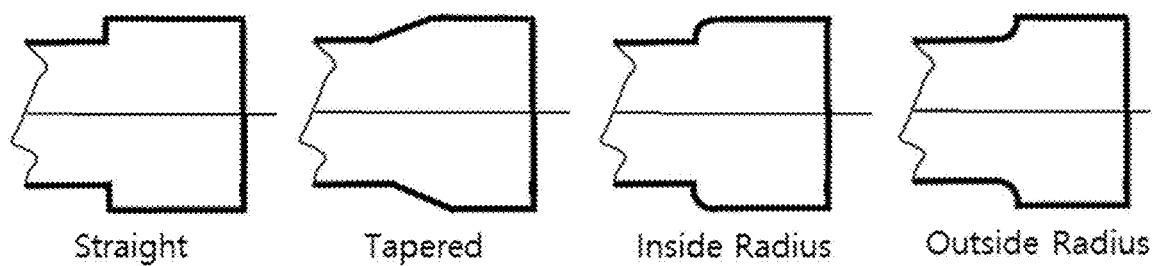
FIG. 5 shows exemplary shapes of transition zone in laminating rolls according to exemplary embodiments of the present disclosure.

In certain embodiments, the laminated composite coil or roll may have transition zone in various shape, e.g., straight, tapered, inside radius or outside radius (FIG. 5). The laminated composite coil or roll may be formed to manufacture of vehicle parts.

Figure 10:
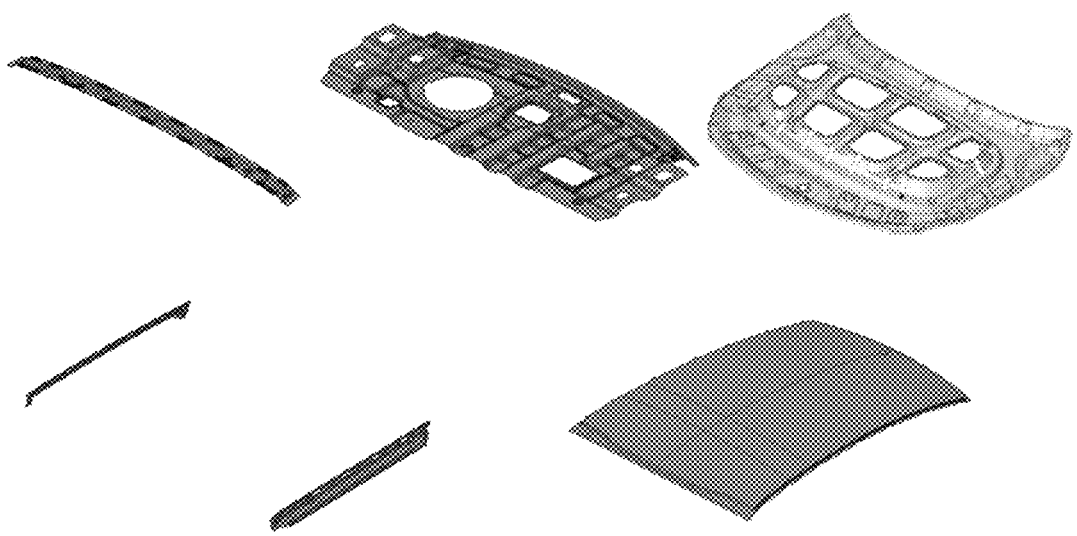
FIG. 10 shows an exemplary vehicle part according to an exemplary embodiment of the present disclosure.

In an aspect, provided is a vehicle part including the laminated composite. The vehicle part may include a roof rail, a panel, a package tray, a hood, a door belt rail, a side member, or a roof panel (FIG. 10).

The laminated composite coils, sheets or blanks may be attached or welded, e.g., by spot or fusion welding, at the connection parts (e.g., flanges), which can be suitably used for manufacturing the vehicle parts. In certain embodiments, the laminated composite coils may be joined by butt (side) or seam (overlap) laser welding. Other types of welding process or joint configurations may be used without limitation.

In addition, the laminated composites formed in coil or blank is fabricated to manufacture a part (e.g., vehicle part) by stamping or other industrially applicable process. The manufactured part may further include one or more reinforcing members attached (welded) to the laminated composite at flange areas (FIGS. 7A and 7B).

Methods

In an aspect, provided is a method of manufacturing the laminated composite. The method includes providing a pair of metal sheets and a polymer; disposing the polymer between the pair of the metal sheets; forming a laminated composite by directly connecting or welding the pair of the metal sheets at one or more connection parts along the length direction. The connection parts do not comprise the polymer.

The method may further include spot-welding or fusion welding the connection parts. In certain embodiments, the method may further include connecting or welding one or more reinforcement members on the connection parts.

The pair of the metal sheets may be connected or welded at the one or more connection parts by pressing, rolling, resistance spot welding, fusional welding, laser welding, electron beam welding, plasma welding, fusion welding, or combinations thereof. Preferably, the pair of the metal sheets may be connected, welded, or laminated by an apparatus pressing or rolling the sheets.

The laminated composite may be formed to have closed ends formed by the pair of the metal sheets along the length direction. The connection parts may be formed in one or more flanges of the metal sheets or in middle portions of the metal sheets along the length direction.

A thickness of the one or more connection parts across the width direction of the laminated composite is less than a thickness of a portion comprising the pair of the metal sheets and polymer.

Figure 8:
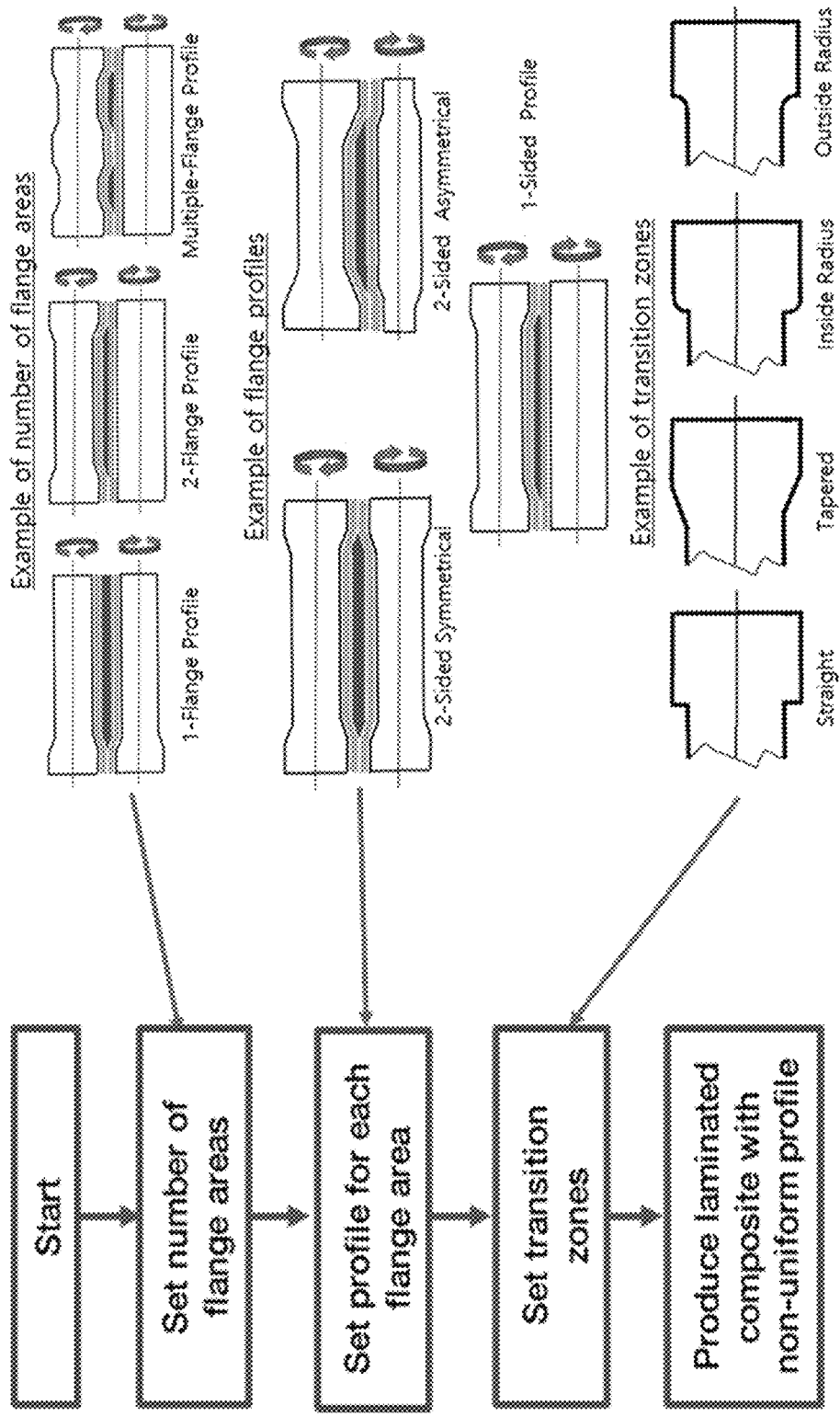
FIG. 8 shows exemplary designing process and manufacturing process for producing laminated composite with non-uniform profile (e.g., non-uniform thickness) according to exemplary embodiments of the present disclosure.
Figure 9:
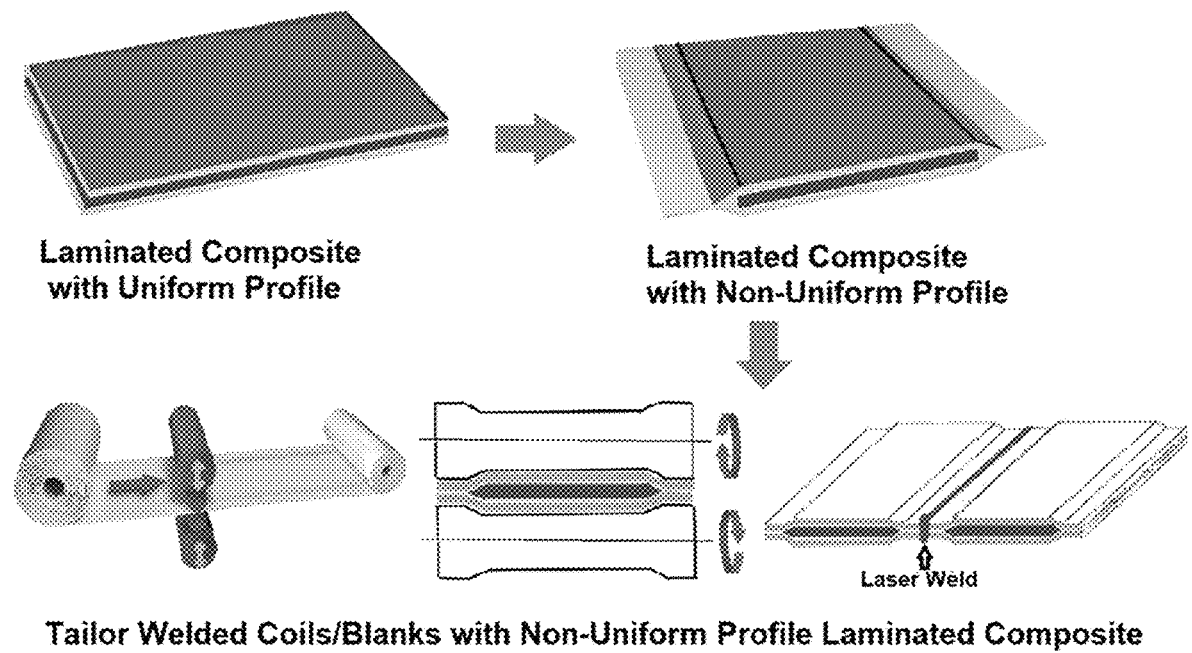
FIG. 9 shows an exemplary method for producing a laminated composites for a vehicle part according to exemplary embodiments of the present disclosure.

In certain embodiments, the methods include steps of (i) designing, e.g., determining or setting numbers of flanges or connection parts, determining or setting profile for each flange, and determining or setting transition zones; and (ii) producing a laminated composite with non-uniform profile (e.g., various thickness, number of flanges and compositions of the composite by adjusting the amount of the polymer) (FIG. 8).

Also provided is a method of manufacturing a vehicle part. The method includes providing one or more laminated composites as described above, or the laminated composites manufactured by methods as described herein; and connecting or welding the one or more laminated composites at flanges of the laminated composites.

Although shown and described with respect to exemplary embodiments of the present invention, it is within the art that the present invention can be variously improved and changed without departing from the spirit of the present invention provided by the following claims. It will be obvious to those of ordinary skilled in the art.

What is claimed is:

1. A laminated composite vehicle part consisting of:
a pair of metal sheets, and
a polymer disposed in an internal space between the pair of the metal sheets,
   wherein the laminated composite comprises one or more connection parts where the pair of the metal sheets are directly connected or welded along the length direction and that do not comprise the polymer,
   wherein the laminated composite further comprises one or more reinforcement members connected to the one or more connection parts,
   wherein the one or more reinforcement members are external to the internal space and do not span across the internal space,
   wherein the polymer comprises poly(fluorene), polyphenylene, polypyrene, polyazulene, polynaphthalene, poly(acetylene), poly(p-phenylene vinylene), poly(pyrrole), polycarbazole, polyindole, polyazepine, polyaniline, poly(thiopene), poly(3,4-ethylenedioxythiopene), or poly(p-phenylene sulfide), or combinations thereof, and
   wherein the laminated composite has a width of about 1,200 mm to about 2,000 mm, each of the metal sheets has a thickness of about 0.05 mm to 10 mm, and the polymer disposed in the internal space has a thickness of about 0.05 mm to 10 mm.

2. The laminated composite vehicle part of claim 1, wherein the laminated composite vehicle part has closed ends formed by the pair of the metal sheets along the length direction.

3. The laminated composite vehicle part of claim 1, wherein the connection parts are formed in one or more flanges of the metal sheets or in middle portions of the metal sheets along the length direction.

4. The laminated composite vehicle part of claim 1, wherein a width of each of the metal sheets is greater than a width of the polymer.

5. The laminated composite vehicle part of claim 1, wherein a thickness of the one or more connection parts across the width direction of the laminated composite vehicle part is less than a thickness of a portion comprising the pair of the metal sheets and polymer.

6. The laminated composite vehicle part of claim 1, wherein the one or more reinforcement members are made of steel.

7. The laminated composite vehicle part of claim 1, wherein the vehicle part is a roof rail, a panel, a package tray, a hood, a door belt rail, or a roof panel.

8. A vehicle comprising the laminated composite vehicle part of claim 1.

9. A method of manufacturing the laminated composite vehicle part of claim 1, comprising:
providing the pair of metal sheets and the polymer;
disposing the polymer between the pair of the metal sheets;
forming the laminated composite by directly connecting or welding the pair of the metal sheets at one or more connection parts along the length direction, wherein the connection parts do not comprise the polymer; and
connecting the one or more reinforcement members to the one or more connection parts.

10. The method of claim 9, further comprising spot-welding or fusion welding the connection parts.

11. The method of claim 9, wherein the pair of the metal sheets are connected or welded at the one or more connection parts by pressing, rolling, resistance spot welding, fusional welding, laser welding, electron beam welding, plasma welding, fusion welding, or combinations thereof.

12. The method of claim 9, wherein the laminated composite has closed ends formed by the pair of the metal sheets along the length direction, and the connection parts are formed in one or more flanges of the metal sheets or in middle portions of the metal sheets along the length direction.

13. The method of claim 9, wherein a thickness of the one or more connection parts across the width direction of the laminated composite is less than a thickness of a portion comprising the pair of the metal sheets and the polymer.

14. A method of manufacturing a vehicle part, comprising:

a) providing one or more of the laminated composite vehicle parts of claim 1, each of which is manufactured by a method comprising:
   (i) providing the pair of metal sheets and the polymer;
   (ii) disposing the polymer between the pair of the metal sheets;
   (iii) forming the laminated composite by directly connecting or welding the pair of the metal sheets at one or more connection parts along the length direction, wherein the connection parts do not comprise the polymer;
   (iv) connecting the one or more reinforcement members to the one or more connection parts; and
b) connecting or welding the one or more laminated composites vehicle parts at flanges of the laminated composites vehicle parts.

* * * * *